US012398226B2

(12) United States Patent
Liao et al.

(10) Patent No.: US 12,398,226 B2
(45) Date of Patent: Aug. 26, 2025

(54) RESIN COMPOSITION

(71) Applicant: NAN YA PLASTICS CORPORATION, Taipei (TW)

(72) Inventors: Te-Chao Liao, Taipei (TW); Wei-Ru Huang, Taipei (TW); Hung-Yi Chang, Taipei (TW); Chia-Lin Liu, Taipei (TW); HungFan Lee, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 492 days.

(21) Appl. No.: 18/149,155

(22) Filed: Jan. 3, 2023

(65) Prior Publication Data
US 2024/0174779 A1 May 30, 2024

(30) Foreign Application Priority Data
Nov. 21, 2022 (TW) .................................. 111144454

(51) Int. Cl.
| C08F 212/08 | (2006.01) |
| C08F 210/02 | (2006.01) |
| C08F 212/36 | (2006.01) |
| C08F 236/06 | (2006.01) |
| C08G 65/48 | (2006.01) |
| C08K 3/36 | (2006.01) |
| C08K 5/04 | (2006.01) |
| C08K 5/49 | (2006.01) |
| C08K 5/5425 | (2006.01) |
| C08K 9/08 | (2006.01) |

(52) U.S. Cl.
CPC .......... *C08F 212/08* (2013.01); *C08F 210/02* (2013.01); *C08F 212/36* (2013.01); *C08F 236/06* (2013.01); *C08G 65/485* (2013.01); *C08K 3/36* (2013.01); *C08K 5/49* (2013.01); *C08K 5/5425* (2013.01); *C08K 9/08* (2013.01); *C08G 2650/04* (2013.01); *C08K 2201/003* (2013.01)

(58) Field of Classification Search
CPC .... C08F 212/08; C08F 210/02; C08F 212/36; C08F 236/06; C08G 65/485; C08G 2650/04; C08K 3/36; C08K 5/49; C08K 5/5425; C08K 9/08; C08K 2201/003
USPC ......................................................... 524/847
See application file for complete search history.

(56) References Cited

U.S. PATENT DOCUMENTS

| 2010/0129676 A1* | 5/2010 | Fujimoto | C08J 3/246 |
| | | | 524/424 |
| 2018/0134842 A1* | 5/2018 | Nagai | C08G 73/127 |
| 2021/0032404 A1* | 2/2021 | Shigaki | B32B 15/20 |

FOREIGN PATENT DOCUMENTS

| CN | 104053302 | 9/2014 |
| CN | 112898561 | 6/2021 |
| JP | 2017071689 | 4/2017 |
| TW | 200904896 | 2/2009 |
| TW | 201702311 | 1/2017 |
| TW | 201741362 | 12/2017 |
| TW | 201908407 | 3/2019 |
| TW | 201934631 | 9/2019 |
| TW | I774559 | 8/2022 |
| WO | 2009128444 | 10/2009 |
| WO | 2020096036 | 5/2020 |
| WO | 2021033442 | 2/2021 |
| WO | 2022054885 | 3/2022 |

OTHER PUBLICATIONS

Notice of allowance of Taiwan Counterpart Application, issued on Aug. 18, 2023, p. 1-p. 4.
"Office Action of Japan Counterpart Application", issued on Feb. 15, 2024, p. 1-p. 2.

* cited by examiner

*Primary Examiner* — Kelechi C Egwim
(74) *Attorney, Agent, or Firm* — JCIPRNET

(57) ABSTRACT

A resin composition is provided. The resin composition includes a resin mixture, a flame retardant, a spherical silica and a siloxane coupling agent. The resin mixture includes a first resin polymerized by a monomer mixture including styrene, divinylbenzene and ethylene, a second resin including a polyphenylene ether resin modified by bismaleimide, and a SBS resin. The resin composition of the present disclosure can have a high glass transition temperature, a low dielectric constant and a low dissipation factor.

13 Claims, No Drawings

RESIN COMPOSITION

CROSS-REFERENCE TO RELATED APPLICATION

This application claims the priority benefit of Taiwan application serial no. 111144454, filed on Nov. 21, 2022. The entirety of the above-mentioned patent application is hereby incorporated by reference herein and made a part of this specification.

BACKGROUND

Technical Field

The present disclosure relates to a resin composition, and particularly relates to a low dielectric constant (low-k) resin composition.

Description of Related Art

In recent years, with the development of 5G communication, the material of a copper foil substrate has been developed towards the goal of lower dielectric properties. The dielectric constant (k) of the conventional copper foil substrate is about 3.2 to 5.0, which is not beneficial to the application of high frequency and fast transmission in the future. Currently, attempts have been made to reduce the dissipation factor of the copper foil substrate by adding a new low-k resin such as a polystyrene resin to the resin composition. However, the copper foil substrate prepared using such new low-k resin also the glass transition temperature and reduces the dissipation factor.

Based on the above, how to develop a low-k resin composition with a low dielectric constant, a low dissipation factor, and a high glass transition temperature (Tg) has become an urgent goal for those skilled in the art.

SUMMARY

The present disclosure provides a low-k resin composition with a low dielectric constant, a low dissipation factor, and a high glass transition temperature (Tg).

The present disclosure provides a resin composition including a resin mixture, a flame retardant, a spherical silica and a siloxane coupling agent. The resin mixture includes a first resin polymerized by a monomer mixture including styrene, divinylbenzene and ethylene, a second resin including a bismaleimide-modified polyphenylene ether resin, and a SBS resin.

In an embodiment of the disclosure, based on a total weight of the resin mixture, a content of the first resin may range from 30 wt % to 60 wt %, a content of the second resin may range from 20 wt % to 40 wt %, and a content of the SBS resin may range from 10 wt % to 30 wt %.

In an embodiment of the disclosure, based on 100 parts by weight of the resin mixture, an added amount of the spherical silica is 20 to 50 parts by weight.

In an embodiment of the disclosure, based on 100 parts by weight of the resin mixture, an added amount of the flame retardant may range from 10 to 50 parts by weight.

In an embodiment of the disclosure, based on 100 parts by weight of the resin mixture, an added amount of the siloxane coupling agent may range from 0.1 to 5 parts by weight.

In an embodiment of the disclosure, a molar ratio of styrene:divinylbenzene:ethylene in the monomer mixture may range from 1:1:1 to 2:2:1.

In an embodiment of the disclosure, a number average molecular weight of the first resin may range from 4,500 to 6,500.

In an embodiment of the disclosure, the bismaleimide-modified polyphenylene ether resin is represented by the following chemical formula:

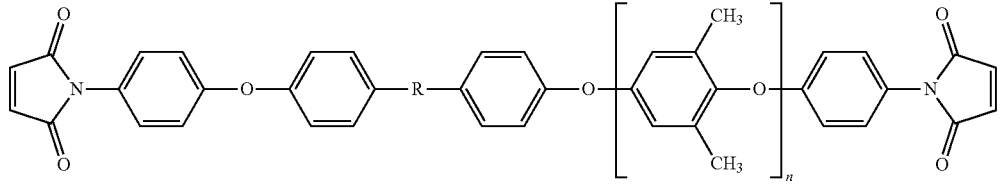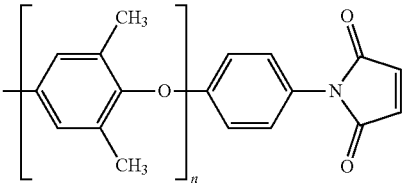

wherein R is a direct bond, a methylene group, an ethylene group, an isopropyl group, a 1-methylpropylene group, a sulfonylene group or a fluorenylene group, and n is an integer between 3 and 25.

In an embodiment of the disclosure, the SBS resin may be polymerized by a monomer mixture including 5% to 40% of styrene, 55% to 90% of 1,2 butadiene, and 5% to 30% of 1,4 butadiene diene.

In an embodiment of the disclosure, a weight average molecular weight of the SBS resin may range from 3,500 to 5,500.

In an embodiment of the disclosure, the resin mixture further includes a polyphenylene ether resin different from the bismaleimide-modified polyphenylene ether resin.

In an embodiment of the disclosure, the spherical silica has acrylic or vinyl surface modification.

In an embodiment of the disclosure, an average particle diameter D50 of the spherical silica may range from 2.0 μm to 3.0 μm.

Based on the above, in the resin composition of the present disclosure, a first resin polymerized by a monomer mixture including styrene, divinylbenzene and ethylene, a polyphenylene ether resin modified by bismaleimide, and a SBS resin are used in combination, so as to achieve a low dielectric constant, a low dissipation factor, and a high glass transition temperature (Tg).

DESCRIPTION OF THE EMBODIMENTS

Embodiments of the disclosure will be described in details below. However, these embodiments are illustrative, and the disclosure is not limited thereto.

Herein, a range indicated by "one value to another value" is a general representation which avoids enumerating all values in the range in the specification. Therefore, the description of a specific numerical range covers any numerical value within the numerical range and the smaller numerical range bounded by any numerical value within the numerical range, as if the arbitrary numerical value and the smaller numerical range are written in the specification.

The resin composition of the present disclosure includes a resin mixture, a flame retardant, a spherical silica and a siloxane coupling agent. The resin mixture includes a first resin polymerized by a monomer mixture including styrene, divinylbenzene and ethylene, a second resin including a polyphenylene ether resin modified by bismaleimide (or called "bismaleimide-modified polyphenylene ether resin" in some examples), and a SBS resin. The above-mentioned various components will be described in details below.

Resin Mixture

In this embodiment, the resin mixture may include a first resin polymerized by a monomer mixture including styrene, divinylbenzene and ethylene, a second resin including a bismaleimide-modified polyphenylene ether resin, and a SBS resin. Optionally, the resin mixture may further include another resin, such as a polyphenylene ether resin other than the bismaleimide-modified polyphenylene ether resin.

First Resin

In this embodiment, the first resin may be polymerized by a monomer mixture including styrene, divinylbenzene and ethylene. In the monomer mixture, the molar ratio of styrene:divinylbenzene:ethylene may range from 1:1:1 to 2:2:1. The number average molecular weight of the first resin may be 4,500 to 6,500. Based on the total weight of the resin mixture, the content of the first resin may range from 30 wt % to 60 wt %. Adding the first resin to the resin composition can help reduce the dielectric constant of the resin.

Second Resin

In this embodiment, the second resin may include a bismaleimide-modified polyphenylene ether resin. For example, the second resin of the present disclosure may be the bismaleimide-modified polyphenylene ether resin disclosed in Taiwan Patent Publication No. 1774559, the entirety of Taiwan Patent Publication No. 1774559 is hereby incorporated by reference herein and made a part of this specification.

For example, the chemical structure of the bismaleimide-modified polyphenylene ether resin may be represented by the following chemical formula:

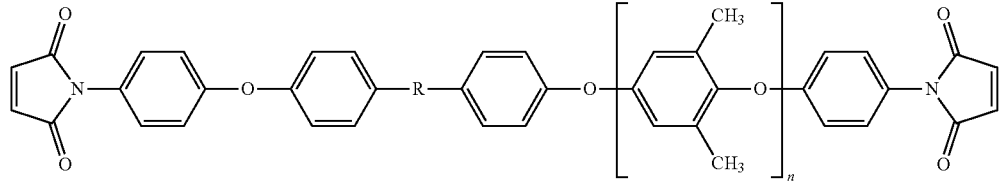

wherein R may include a direct bond, a methylene group, an ethylene group, an isopropyl group, a 1-methylpropylene group, a sulfonylene group or a fluorenylene group, and n may be an integer from 3 to 25, preferably an integer from 10 to 18.

The bismaleimide-modified polyphenylene ether resin may be formed by the manufacturing method disclosed in Taiwan Patent Publication No. 1774559, but the present disclosure is not limited thereto. For example, the bismaleimide-modified polyphenylene ether resin can also be formed by other suitable modification method.

Based on the total weight of the resin mixture, the content of the second resin may range from 20 wt % to 40 wt %. The chemical structure of the second resin has a main chain of polyphenylene ether and ends modified by reactive groups (i.e., bismaleimide) with high heat resistance, so the second resin has a relatively low dielectric constant and a dielectric loss.

SBS Resin

In this example, the SBS resin refers to a styrene-butadiene-styrene block copolymer (SBS), and the SBS resin may be polymerized by a monomer mixture including 5% to 40% of styrene, 55% to 90% of 1,2 butadiene and 5% to 30% of 1,4 butadiene. The SBS resin may have a weight average molecular weight of 3,500 to 5,500. Based on the total weight of the resin mixture, the content of the SBS resin may range from 10 wt % to 30 wt %. The SBS resin can improve the phase separation between resins, improve fluidity and filling properties, thereby enhancing overall processability while maintaining low dielectric properties.

Polyphenylene Ether Resin

In some embodiments, in addition to the bismaleimide-modified polyphenylene ether resin, the resin mixture of the present disclosure may further include another polyphenylene ether resins, such as a thermosetting polyphenylene ether resin having at least one modified group. The modified group may be selected from the group consisting of a hydroxyl group, an amine group, a vinyl group, a styryl group, a methacrylate group, an epoxy group and a combination thereof. Based on the total weight of the resin mixture, the added amount of the polyphenylene ether resin may range from 0 wt % to 20 wt %.

Specific examples of the polyphenylene ether resin may include, for example but not limited to, MX90 (in which the modified groups at two ends are hydroxyl groups) or MX9000 (in which the modified group at two ends are methacrylate group) (purchased from Saudi Basic Industries Corporation (SABIC)), or OPE-2St (in which the modified groups at two ends are styryl groups), OPE-2EA (in which the modified groups at two ends are methacrylate groups) or OPE-2Gly (in which the modified groups at two ends are epoxy groups) (purchased from Mitsubishi Gas Chemical Corporation (MGC)).

Flame Retardant

In this embodiment, the flame retardant may include a phosphorus-containing flame retardant or a bromine-containing flame retardant. Specific examples of the flame retardant may include, for example but are not limited to, Exolit OP 935 (purchased from Clariant), SPB-100 (purchased from Otsuka Chemical), PX-200 (purchased from Daihachi Chemical), PQ-60 (purchased from purchased from Jinyi Chemical), etc. Based on 100 parts by weight of the resin mixture, the flame retardant may be added in an amount of 10 to 50 parts by weight.

Spherical Silica

In this embodiment, the spherical silica can preferably be prepared by a synthetic method to reduce electrical properties and maintain fluidity and gel filling properties. The spherical silica may have acrylic or vinyl surface modification, the purity is above 99.0%, and the average particle size D50 may range from about 2.0 μm to 3.0 Based on 100 parts by weight of the resin mixture, the added amount of the spherical silica added may range from 20 to 50 parts by weight.

Siloxane Coupling Agent

In this embodiment, the siloxane coupling agent may include, for example but not limited to, a siloxane compound. In addition, according to the types of functional groups, the siloxane coupling agent may be divided into an amino silane compound, an epoxide silane compound, a vinyl silane compound, an ester silane compound, a hydroxyl silane compound, an isocyanate silane compound, a methacryloxysilane compound and an acryloxysilane compound. Based on 100 parts by weight of the resin mixture, the added amount of the siloxane coupling agent may range from 0.1 to 5 parts by weight. The siloxane coupling agent can enhance the compatibility and cross-linking degree of the resin composition for glass fiber cloth and powder.

Additive

In addition to the above components, the resin composition of the present disclosure may also contain other additives, such as a peroxide initiator.

It should be noted that the resin composition of the disclosure may be processed to a prepreg and/or a copper foil substrate (or called a "copper clad laminate (CCL)" in some examples) according to actual design requirements. Therefore, the prepreg and the copper foil substrate fabricated by the resin composition of the disclosure also have a low dielectric constant, a low dissipation factor and a high glass transition temperature, and therefore exhibit better reliability (e.g., maintain the desired electrical properties). Specifically, the prepreg and the copper foil substrate fabricated by the resin composition may have a dielectric constant of 3.0 to 3.1, a dissipation factor of about 0.0015 or less, and a glass transition temperature of 180° C. or higher, e.g., ranging from about 200° C. to about 250° C.

Hereinafter, the above-mentioned resin composition of the disclosure will be described in detail by means of experimental examples. However, the following experimental examples are not intended to limit the disclosure.

EXPERIMENTAL EXAMPLE

Preparation Example: Preparation of Second Resin

A polyphenylene ether resin material having a number average molecular weight (Mn) of equal to or less than 12,000, or equal to or less than 10,000 (e.g., Mn=500, 1,400, 1,600 or 1,800) was dissolved in dimethylacetamide, and potassium carbonate and tetrafluoronitrobenzene were then added thereinto. The above reaction solution was heated up to 140° C., reacted for 8 hours, and then cooled down to room temperature, followed by filtrated to remove the solid. The filtrated solution was precipitated using methanol/water, and the precipitate was a nitrated polyphenylene ether resin. Then, the nitrated polyphenylene ether resin was dissolved in dimethylacetamide, and hydrogenated at 90° C. for 8 hours to obtain an aminated polyphenylene ether resin. Thereafter, the aminated polyphenylene ether resin was put in toluene, maleic anhydride and p-toluenesulfonic acid were added therein, the temperature was raised to 120° C. to reflux, and reacted for 8 hours to obtain a second resin. The obtained second resin was a polyphenylene ether resin modified by bismaleimide (or called "PPE-BMP" in some examples).

Evaluation Method

The copper foil substrates produced in Experimental examples and Comparative example were evaluated by the following methods.

"Glass transition temperature (° C.)" is tested by using a dynamic mechanical analyzer (DMA).

"Water absorption (%)" is calculated by the weight change of the sample before and after heating the sample in a pressure cooker at 120° C. and 2 atm for 120 minutes.

"288° C. solder heat resistance (seconds)" indicates immersing the sample in a soldering furnace at 288° C. after heating the sample in a pressure cooker at 120° C. and 2 atm for 120 minutes, and recording the time required for sample explosion/delamination.

"Dielectric constant Dk" is measured by using a dielectric analyzer (model HP Agilent E4991A) to test the dielectric constant at a frequency of 10 GHz.

"Dissipation factor Df" is measured by using a dielectric analyzer (model HP Agilent E4991A) to test the dissipation factor at a frequency of 10 GHz.

"Resin flow rate" indicates pressing the sample by a press at 170° C. (±2.8° C.) and 200 psi (±25 psi) for 10 minutes. After fusion and cooling, a disc is punched out, and an accurate weight of the disc is weighted, so as to calculate the outflow amount of the resin.

Resin Phase Separation (Slice Analysis):

Step 1: The copper foil substrate is cut into a size of 1 cm*1 cm, and then put into a mold for resin grouting.

Step 2: After the resin is completely dried and hardened, the sample is grinded and polished.

Step 3: The sample is analyzed by a high-resolution microscope such as OM/SEM to confirm if there is resin phase separation inside the sample.

Property Evaluation

Each resin composition shown in Table 1 was mixed with toluene to form a thermosetting resin composition varnish. The varnish was impregnated with Nanya fiberglass cloth (cloth type 1078LD from Nanya Plastics Cooperation) at room temperature. A prepreg with a resin content of 79 wt % was obtained after drying for several minutes at 170° C. (in impregnator). Finally, 4 pieces of the prepreg were stacked layer by layer between two layers of 35 μm thick copper foils. Under a pressure of 25 kg/cm 2 and a temperature of 85° C., a constant temperature was kept for 20 minutes. Then, after heating to 210° C. at a heating rate of 3° C./min, a constant temperature was kept again for 120 minutes. Then, the temperature was slowly cooled down to 130° C. to obtain a 0.59 mm thick copper foil substrate.

In Table 1, the details of each component are as follows:

First resin: model Poly-DVB purchased from Denka Company

Second resin: obtained from the Preparation Example

SBS resin: model 1,2-SBS Type-C purchased from Japan Soda Company

Polyphenylene ether resin: model MX9000 purchased from Sabic Company

Spherical silica: model EQ2410-SMC purchased from Sanshiji Company

Flame retardant: model PQ-60 purchased from Jinyi Chemical Company

Siloxane coupling agent: model Z-6030 purchased from Dow Corning

Peroxide: model Luperox F purchased from ARKEMA Company

TABLE 1

| | | | Example 1 | Example 2 | Comparative Example 1 |
|---|---|---|---|---|---|
| Resin composition | Resin mixture | first resin (parts by weight) | 40 | 40 | 40 |
| | | second resin (parts by weight) | 20 | 40 | — |
| | | SBS resin (parts by weight) | 20 | 20 | 20 |
| | | polyphenylene ether resin (parts by weight) | 20 | — | 40 |
| | spherical silica (parts by weight) | | 40 | 40 | 40 |
| | flame retardant (phr) | | 30 | 30 | 30 |
| | peroxide (phr) | | 1 | 1 | 1 |
| | siloxane coupling agent (phr) | | 0.5 | 0.5 | 0.5 |
| B stage curing temperature (° C.) | | | 130 | 130 | 130 |
| Glass transition temperature (° C.) | | | 185 | 200 | 168 |
| Water absorption (PCT ½ hour) (%) | | | 0.19 | 0.22 | 0.18 |
| Heat resistance (PCT ½ hour) | | | OK | OK | OK |
| Water absorption (PCT 2 hours) (%) | | | 0.25 | 0.29 | 0.24 |
| Heat resistance (PCT 2 hours) | | | OK | OK | OK |
| Dielectric constant (Dk) (at a frequency of 10 GHz) | | | 3.05 | 3.07 | 3.01 |
| Dissipation factor (Df) (at a frequency of 10 GHz) | | | 0.00146 | 0.00148 | 0.00142 |
| Resin flow rate (%) | | | 37 | 35 | 38 |
| Resin phase separation (Slice analysis) | | | No resin phase separation | No resin phase separation | No resin phase separation |

As shown in Table 1, the copper foil substrate of Comparative Example 1 does not use the second resin including a bismaleimide-modified polyphenylene ether resin, so it has the disadvantage of a low glass transition temperature. In comparison, the copper foil substrates of Example 1 and Example 2 use the resin composition formula of the present disclosure in which the second resin is added, and thus achieve a high glass transition temperature while maintaining a low dielectric constant and a low dissipation factor.

In summary, in the resin composition of the present disclosure, a first resin polymerized by a monomer mixture including styrene, divinylbenzene and ethylene, a polyphenylene ether resin modified by bismaleimide, and a SBS resin are used in combination, so as to achieve a low dielectric constant, a low dissipation factor, and a high glass transition temperature (Tg).

What is claimed is:
1. A resin composition, comprising:
a resin mixture, comprising:
a first resin polymerized by a monomer mixture comprising styrene, divinylbenzene, and ethylene;
a second resin comprising a bismaleimide-modified polyphenylene ether resin; and
a SBS resin;
a flame retardant;
a spherical silica; and
a siloxane coupling agent.

2. The resin composition according to claim 1, wherein based on a total weight of the resin mixture, a content of the first resin is 30 wt % to 60 wt %, a content of the second resin is 20 wt % to 40 wt %, and a content of the SBS resin is 10 wt % to 30 wt %.

3. The resin composition according to claim 1, wherein based on 100 parts by weight of the resin mixture, an added amount of the spherical silica is 20 to 50 parts by weight.

4. The resin composition according to claim 1, wherein based on 100 parts by weight of the resin mixture, an added amount of the flame retardant is 10 to 50 parts by weight.

5. The resin composition according to claim 1, wherein based on 100 parts by weight of the resin mixture, an added amount of the siloxane coupling agent ranges from 0.1 to 5 parts by weight.

6. The resin composition according to claim 1, wherein a molar ratio of styrene:divinylbenzene:ethylene in the monomer mixture ranges from 1:1:1 to 2:2:1.

7. The resin composition according to claim 1, wherein a number average molecular weight of the first resin ranges from 4,500 to 6,500.

8. The resin composition according to claim 1, wherein the bismaleimide-modified polyphenylene ether resin is represented by the following chemical formula:

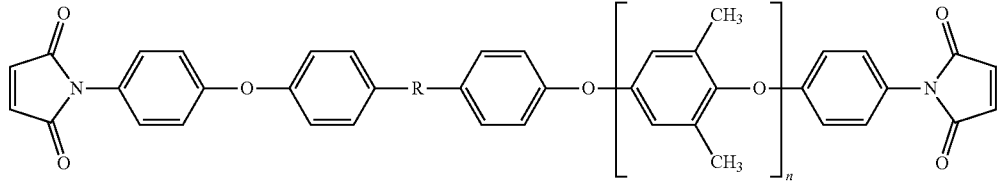

wherein R is a direct bond, a methylene group, an ethylene group, an isopropyl group, a 1-methylpropylene group, a sulfonylene group or a fluorenylene group, and n is an integer between 3 and 25.

9. The resin composition according to claim 1, wherein the SBS resin is polymerized by a monomer mixture comprising 5% to 40% of styrene, 55% to 90% of 1,2 butadiene, and 5% to 30% of 1,4 butadiene diene.

10. The resin composition according to claim 1, wherein a weight average molecular weight of the SBS resin ranges from 3,500 to 5,500.

11. The resin composition according to claim 1, wherein the resin mixture further comprises a polyphenylene ether resin different from the bismaleimide-modified polyphenylene ether resin.

12. The resin composition according to claim 1, wherein the spherical silica has acrylic or vinyl surface modification.

13. The resin composition according to claim 1, wherein an average particle diameter D50 of the spherical silica ranges from 2.0 μm to 3.0 μm.

* * * * *